(12) United States Patent
Cote (10) Patent No.: US 10,130,079 B2
(45) Date of Patent: Nov. 20, 2018

(54) PERCH FOR A BIRD FEEDER (71) Applicant: Paul L. Cote, Knowlton (CA)

(72) Inventor: Paul L. Cote, Knowlton (CA)

( * ) Notice: Subject to any disclaimer, the term of this patent is extended or adjusted under 35 U.S.C. 154(b) by 300 days.

(21) Appl. No.: 15/043,911

(22) Filed: Feb. 15, 2016

(65) Prior Publication Data

US 2017/0231202 A1  Aug. 17, 2017

(51) Int. Cl.
*A01K 31/12* (2006.01)
*A01K 39/012* (2006.01)

(52) U.S. Cl.
CPC ............ *A01K 39/012* (2013.01); *A01K 31/12* (2013.01)

(58) Field of Classification Search
CPC ....... A01K 39/00; A01K 39/012; A01K 31/12
USPC .......... 119/51.01, 57.8, 531, 533, 52.2, 468; D30/110, 121, 124–128
See application file for complete search history.

(56) References Cited

U.S. PATENT DOCUMENTS

| | | | | |
|---|---|---|---|---|
| 4,498,423 A * | 2/1985 | Gainsboro | ......... | A01K 39/0113 119/57.8 |
| 5,048,461 A * | 9/1991 | Wessner | ............. | A01K 39/0113 119/52.3 |
| 5,829,382 A * | 11/1998 | Garrison | .............. | A01K 39/012 119/52.2 |
| 6,199,510 B1 * | 3/2001 | Louden | ................ | A01K 1/0356 119/51.01 |
| 6,415,737 B2 | 7/2002 | Banyas et al. | | |
| 7,021,241 B2 | 4/2006 | Nock | | |
| 7,032,539 B1 * | 4/2006 | Obenshain | ........... | A01K 39/012 119/52.2 |
| 7,086,352 B2 * | 8/2006 | Goodger | ................ | A01K 31/12 119/537 |
| 7,261,056 B2 * | 8/2007 | Hunter | ................. | A01K 39/012 119/52.2 |
| 7,513,219 B2 * | 4/2009 | Louden | ................ | A01K 1/0356 119/477 |
| 7,549,394 B2 * | 6/2009 | Nock | ..................... | A01K 31/12 119/52.3 |
| 7,694,652 B2 | 4/2010 | Fahey | | |
| 7,739,982 B2 | 6/2010 | Cote | | |
| 7,789,040 B2 * | 9/2010 | Liethen | ................ | A01K 39/012 119/57.8 |
| 8,434,425 B2 | 5/2013 | Cote | | |
| 8,807,081 B1 * | 8/2014 | Gage | ...................... | A01K 31/12 119/52.3 |
| D723,226 S * | 2/2015 | Krueger | ............... | A01K 1/0356 D30/127 |

(Continued)

FOREIGN PATENT DOCUMENTS

FR   333580 A * 11/1903 ........... A01K 39/012
GB   989929 A *  4/1965 ........... A01K 39/012

*Primary Examiner* — Marc Burgess
*Assistant Examiner* — Morgan T Barlow
(74) *Attorney, Agent, or Firm* — Dennis L. Thomte; Thomte Patent Law Office LLC (57) ABSTRACT A U-shaped perch for a bird feeder which is selectively movable between retracted and extended positions with respect to the bird feeder. The perch is horizontally slidably mounted in a support at the lower end of a feed port positioned in a feed opening formed in the bird feeder. The perch is selectively locked in its extended position. The perch and the support cooperate to limit the outward extension of the perch with respect to the support. The perch may also be movably mounted on the bird feeder which does not have a feed port.

1 Claim, 8 Drawing Sheets (56) References Cited

U.S. PATENT DOCUMENTS

| | | | |
|---|---|---|---|
| D725,314 S * | 3/2015 | Clark, Jr. | A01K 39/0113 D30/110 |
| 9,038,570 B2 | 5/2015 | Cote | |
| 9,526,232 B2 * | 12/2016 | Cote | A01K 39/0113 |
| 2002/0124806 A1 * | 9/2002 | Blohm | A01K 39/0113 119/57.8 |
| 2003/0226514 A1 * | 12/2003 | Cote | A01K 39/0113 119/57.9 |
| 2004/0231606 A1 * | 11/2004 | Nock | A01K 31/12 119/57.8 |
| 2006/0260553 A1 * | 11/2006 | Cote | A01K 39/0113 119/57.8 |
| 2008/0078329 A1 * | 4/2008 | Hunter | A01K 39/012 119/57.8 |
| 2009/0283046 A1 * | 11/2009 | Black | A01K 39/012 119/52.3 |
| 2011/0083609 A1 * | 4/2011 | Cote | A01K 39/012 119/52.2 |
| 2011/0126771 A1 | 6/2011 | Cote | |
| 2015/0122186 A1 * | 5/2015 | Donegan | A01K 39/0113 119/51.5 |
| 2015/0136032 A1 * | 5/2015 | Cote | A01K 39/012 119/57.8 |
| 2016/0128307 A1 * | 5/2016 | Cote | A01K 39/012 119/52.2 |

\* cited by examiner

PERCH FOR A BIRD FEEDER

BACKGROUND OF THE INVENTION

Field of the Invention

This invention relates to a perch for a bird feeder and more particularly to a perch for a bird feeder which is selectively movable between retracted and extended positions with respect to the bird feeder. Even more particularly, this invention relates to a perch for a bird feeder which includes a locking means for selectively locking the perch in its extended position.

Description of the Related Art

Bird feeders have long been used to feed birds. Many of the prior art bird feeders also include some form of a bird perch adjacent a feed opening in the bird feeder to enable a bird to land on the perch so that the bird may reach the bird feed in the bird feeder by way of the feed opening.

Normally the perches of the prior art bird feeders extend outwardly from the bird feeder which makes the shipment thereof requiring a shipping box or carton having a large size to accommodate the outwardly extending perches. Some prior art perches are selectively movable between an inoperative position to a feeding position. However, the prior art perches which are selectively movable between an inoperative position to a feeding position do not have any means to lock the perch in its feeding position whereby the perch may be inadvertently moved from its feeding position to an inoperative position during the use of the feeder.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A perch for a bird feeder is described wherein the perch is retractable and extendable with respect to the body of the bird feeder. The bird feeder is normally a vertically disposed tubular seed container having an upper end, a lower end, a side wall and an interior. The seed container has at least one feed opening, having an upper end and a lower end, formed in the side wall thereof. A feed port assembly, having upper and lower ends, is mounted in the feed opening. A horizontally disposed and generally U-shaped perch is horizontally movably mounted in the feed port assembly at the lower end of the feed port assembly. The generally U-shaped perch includes a horizontally disposed first leg member having an inner end and an outer end, a horizontally disposed second leg member having an inner end and an outer end, and a horizontally disposed base leg member extending between the outer ends of the first and second leg members.

The perch is selectively horizontally movable with respect to the feed port assembly and the seed container between an extended position and a retracted position. The base leg member is closely positioned adjacent the feed port assembly when the perch is in the retracted position. The base leg member is positioned outwardly of the feed port assembly when the perch is in its extended position so that the first and second leg members and the base leg members may serve as a perch for birds landing thereon.

In the preferred embodiment, the feed port assembly includes an integrally formed horizontally disposed support at its lower end with the perch being horizontally slidably mounted in the support. The support has elongated first and second bores formed therein with the first leg member being slidably mounted in the first bore and the second leg member being slidably mounted in the second bore. One of the first and second leg members includes means for limiting the outward movement of the perch. The other leg member includes a locking means for yieldably locking the perch in its extended position.

In another embodiment of the invention, the perch is selectively movable with respect to the seed container wherein a feed port assembly is not utilized.

It is therefore a principal object of the invention to provide an improved perch for a bird feeder.

A further object of the invention is to provide a perch for a bird feeder which is selectively movable between retracted and extended positions with the retracted position of the perch eliminating the need for an enlarged carton or box for shipment purposes.

A further object of the invention is to provide a perch for a bird feeder which includes means for selectively locking the perch in its extended position.

A further object of the invention is to provide a perch for a bird feeder which includes means for yieldably maintaining the perch in positions between its extended and retracted positions.

A further object of the invention is to provide a perch for a bird feeder which is selectively movable between retracted and extended positions with respect to the seed container of the bird feeder.

A further object of the invention is to provide a perch for a bird feeder which limits the outward movement of the perch.

A further object of the invention is to provide a perch for a bird feeder which may be used with many different types of feed port assemblies.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Figure 1:
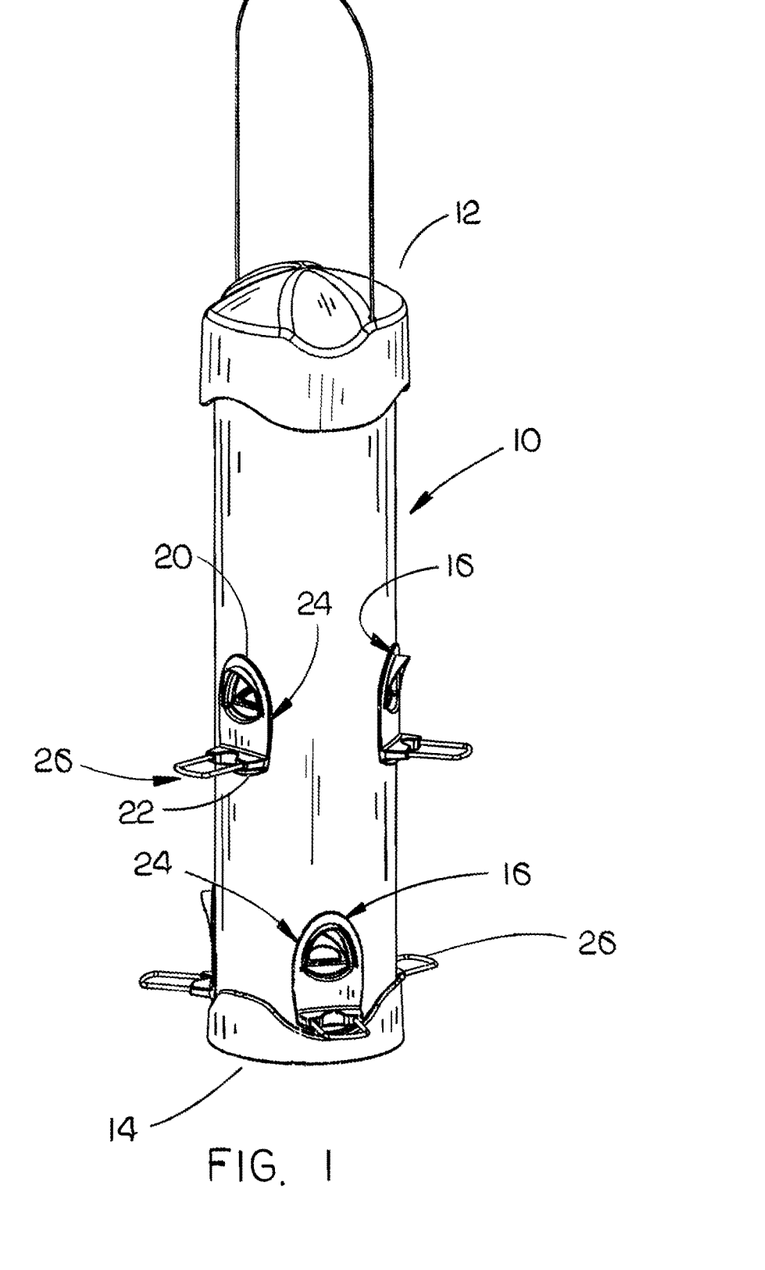
FIG. 1 is a perspective view of a bird feeder having a plurality of perches of this invention mounted thereon with the perches being in an extended position.

The numeral 10 refers to a vertically disposed bird feeder of the tube type and which has an upper end 12 and a lower end 14. Bird feeder 10 has a plurality of spaced-apart feed access openings 16 formed in the side wall 18 thereof. Inasmuch as the feed access openings 16 are identical, only a single feed access opening 16 will be described in detail. Feed access opening 16 includes an upper end 20 and a lower end 22. A feed port assembly 24 is mounted in each of the feed access openings 16. Inasmuch as the feed port assemblies 24 are identical, only a single feed port assembly 24 will be described in detail. The numeral 26 refers to a perch assembly which is mounted or provided at the lower end of each feed port assembly 24. Except for the perch assembly 26, the feed port assembly 24 is conventional and may be of any configuration and construction.

Figure 2:
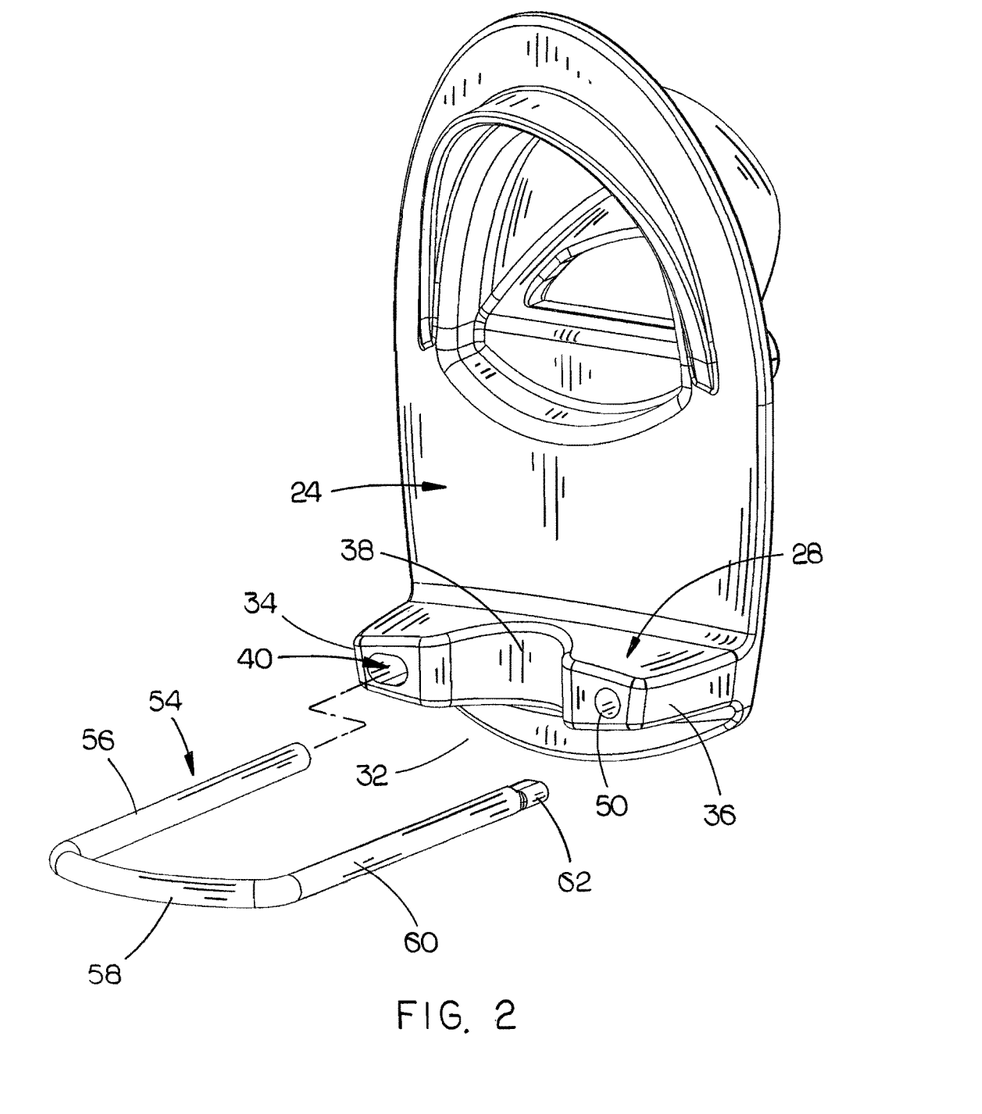
FIG. 2 is a front exploded perspective view of a feed port assembly having the perch of this invention mounted thereon.
Figure 3:
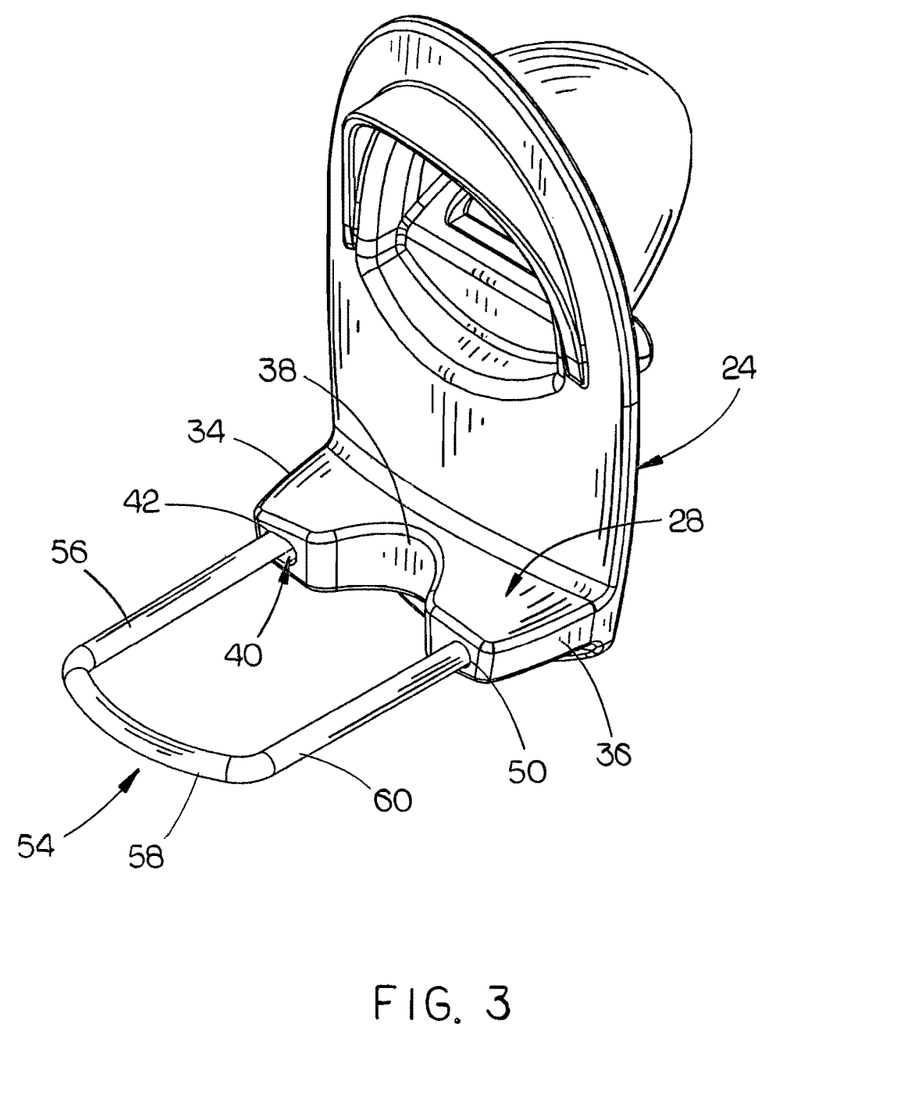
FIG. 3 is a front perspective view of a feed port assembly having the perch of this invention mounted thereon and with the perch of this invention being in an extended position.
Figure 4:
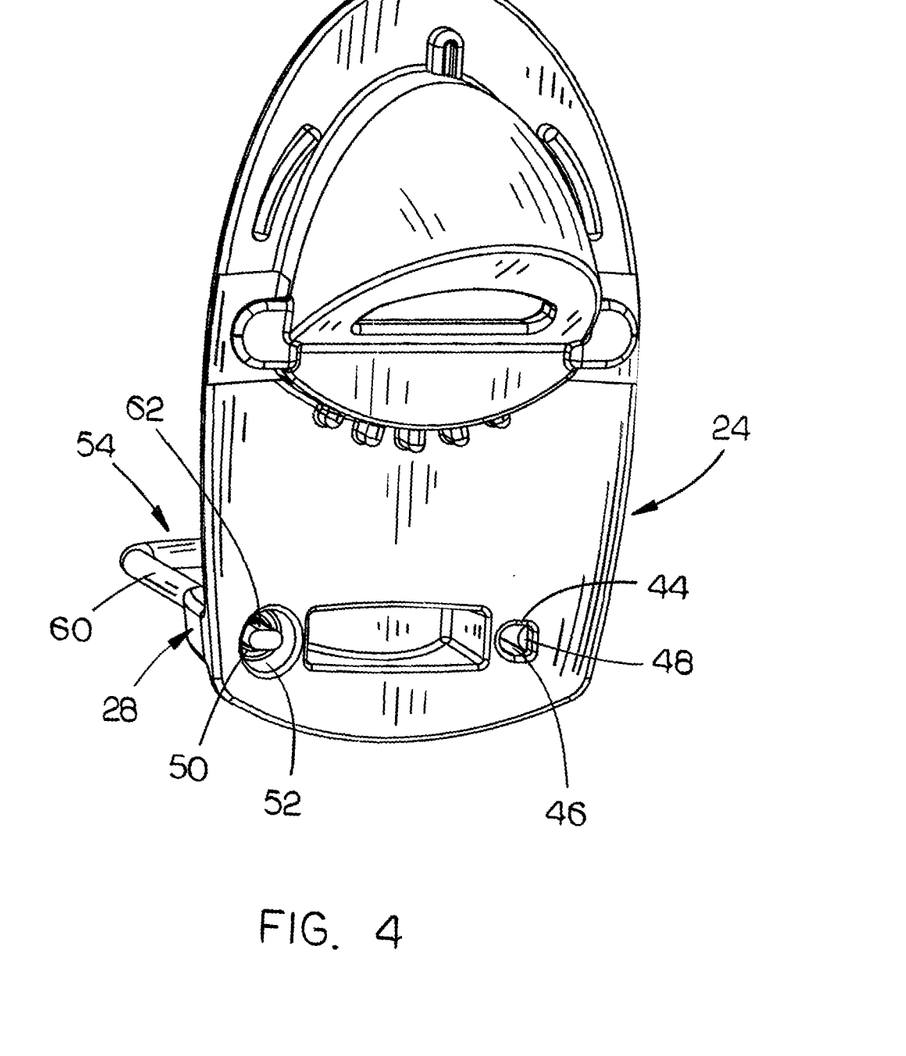
FIG. 4 is a back perspective view of a feed port assembly having the perch of this invention mounted thereon with the perch being in an extended position.

Perch assembly 26 includes a horizontally disposed base or support structure 28 having an inner end 30, an outer end 32, and ends 34 and 36. A generally U-shaped recess 38 is formed in the outer end 32 of base 28. Base 28 may be of plastic or metal construction. Base 28 may be integrally formed or molded with its associated feed port assembly 24 or attached thereto by any convenient means. It is preferred that the base 28 be integrally formed with its associated feed port assembly 24 and will be described herein as being integrally formed or molded with the feed port assembly 24.

The numeral 40 refers to an elongated and horizontally disposed bore which extends inwardly into the outer end of base 28 and which has an oval cross-section. For purposes of description, bore 40 will be described as having an outer end 42 and an inner end 44. As seen, the inner end 44 of bore 40 is spaced inwardly from the inner end 30 of base 28. A bore 46 extends inwardly into feed port 24 and base 28 from the inner end 30 thereof. Bore 46 has a circular or cylindrical cross-section. The inner end of bore 46 communicates with the inner end 44 of bore 40 to form a transversely extending shoulder 48 at the juncture of bores 40 and 46.

The numeral 50 refers to an elongated and horizontally extending bore which extends inwardly into base 28 from the outer end 32 thereof. Bore 50 includes an enlarged diameter portion 52 at its inner end. The numeral 54 refers to a generally U-shaped perch member which is selectively horizontally slidably mounted in base 28 between extended and retracted positions. Perch member 54 includes an elongated leg member 56, a base leg member 58, and an elongated leg member 60. Perch member 54 may be comprised of a metal material or a plastic material. In any event, the leg members 56 and 58 are resilient or "springy" and normally yieldably extend slightly laterally and inwardly from the ends of base leg member. As seen, the inner end of leg member 60 has an enlarged head member 62 provided thereon. Head member 62 has a diameter greater than the diameter of bore 50. Leg member 56 slidably extends through bore 42 and bore 46. Leg member 60 slidably extends through bore 50 and enlarged diameter portion 52.

Figure 5:
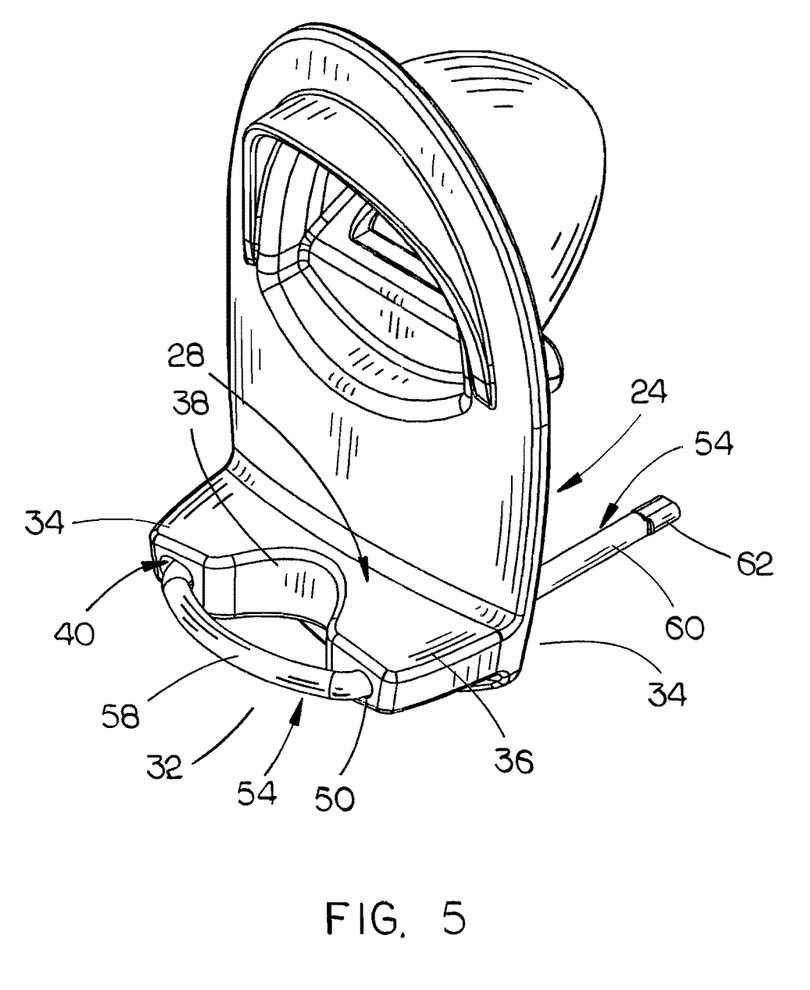
FIG. 5 is a front perspective view of a feed port assembly having the perch of this invention mounted thereon and with the perch of this invention being in a retracted position.
Figure 6:
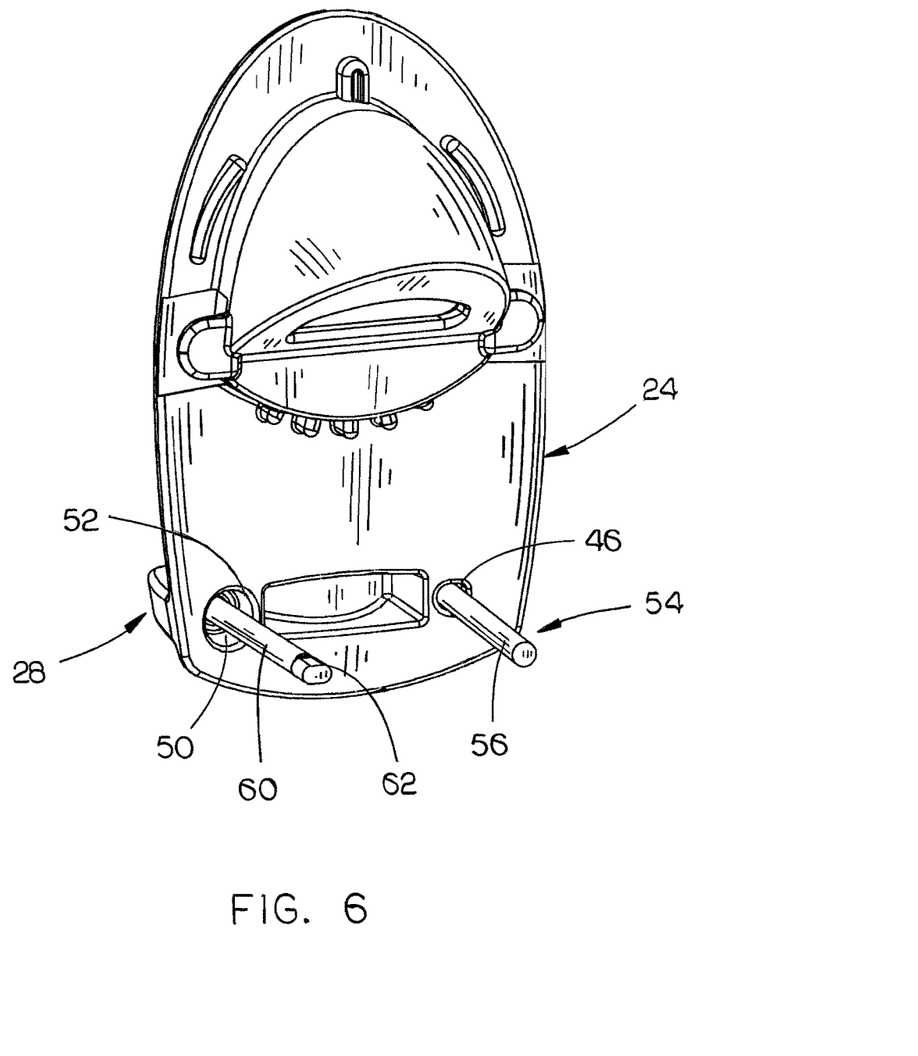
FIG. 6 is a back perspective view of a feed port assembly having the perch of this invention mounted thereon with the perch being in a retracted position.

When the perch 54 is in its retracted position of FIG. 5, the base leg member 58 is closely positioned adjacent base 28. Thus, when the perches 54 are in their retracted positions, the bird feeder 10 may be shipped in a fairly small carton or container. The frictional engagement of leg members 56 and 60 with the side walls of bores 40 and 50 respectively yieldably maintains the perch 54 in the retracted position.

The frictionally engagement of leg members 56 and 60 with the side walls of bores 40 and 50 respectively yieldably maintains the perch 54 in position between its extended and retracted positions.

Figure 7:
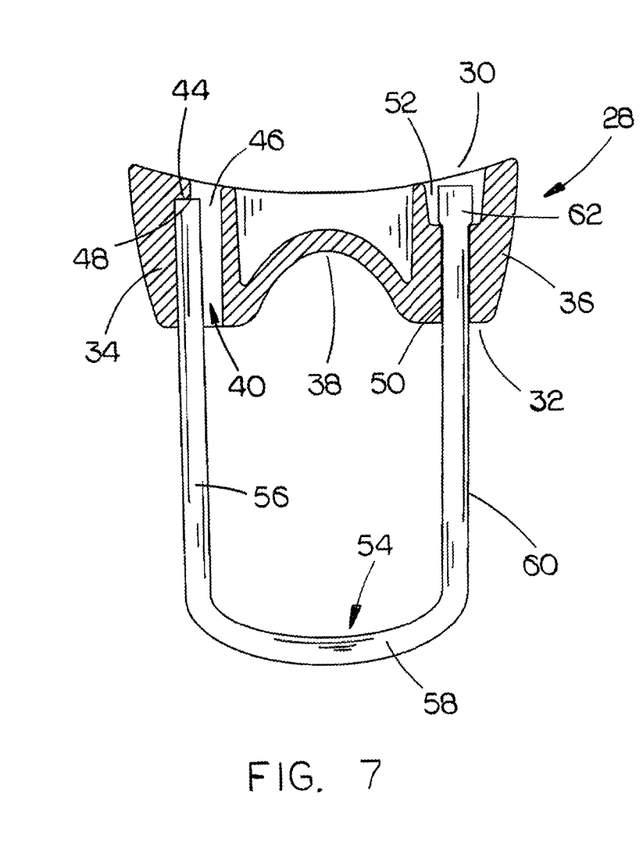
FIG. 7 is a partial sectional view illustrating the perch of this invention in a locked extended position.

When it is desired to move the perch 54 from its retracted position to its extended position, a person grasps the base leg member 58 and pulls the perch 54 outwardly with respect to base 28. The perch 54 may be pulled outwardly with respect to base 28 until the enlarged head portion 62 engages the shoulder at the inner end of bore 50 thereby limiting the outward movement of perch 54. At that same time, the inner end of leg member 56 will be positioned adjacent the shoulder 48 and will snap or spring laterally outwardly so that shoulder 48 prevents inwardly movement of perch 54 from its extended position. Thus, the engagement of the inner end of leg member 56 with shoulder 48 selectively locks perch 54 in its extended position.

Figure 8:
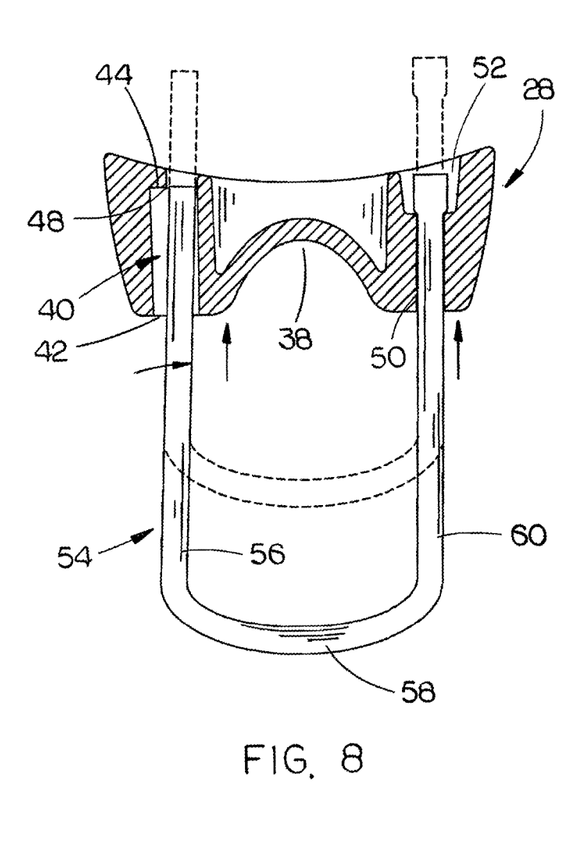
FIG. 8 is a partial sectional view illustrating the manner in which the perch is moved to its unlocked position with the broken lines illustrating the perch being moved from its extended position to its retracted position.
Figure 9:
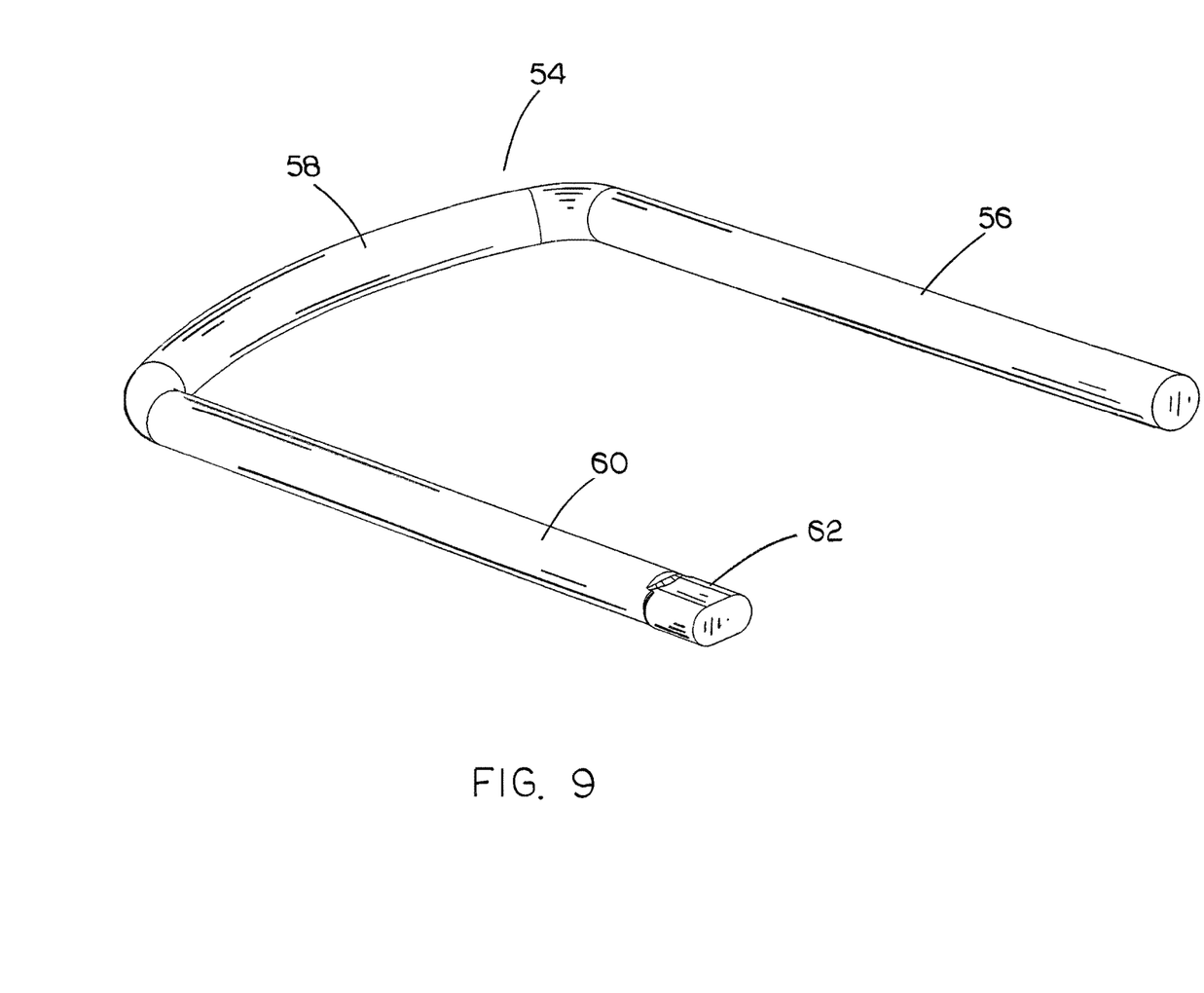
FIG. 9 is a rear perspective view of the perch of this invention.

When it is desired to move the perch 54 from its extended position to its retracted position, the leg member 56 is squeezed laterally to disengage the inner end of leg member 56 from shoulder 48. The inner end of leg member 56 will then be in alignment with bore 46 so that the perch 54 may be moved inwardly to its retracted position.

Although it is preferred that the perch 54 be selectively horizontally movable with respect to the feed port assembly 24, in some cases the perch 54 may be selectively horizontally movable with respect to a bird feeder 10 when feed port assemblies are not present on the bird feeder 10. In that case, the side wall of the bird feeder will have openings formed therein which slidably receive the leg members 56 and 60 of the perch 54.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A bird feeder, comprising:
    a vertically disposed seed container having an upper end, a lower end, a side wall and an interior;
    said seed container having at least one feed opening, having an upper end and a lower end, formed in said side wall;
    a feed port assembly, having upper and lower ends, mounted in said feed opening;

said feed port assembly including a horizontally disposed support at said lower end of said feed port assembly;

said support having an elongated and horizontally extending first bore formed therein which has an inner end, an outer end and a side wall;

said first bore having a reduced diameter portion at said inner end thereof thereby creating a shoulder in said first bore outwardly of said inner end thereof;

said support having an elongated and horizontally extending second bore formed therein which has an inner end, an outer end and a side wall;

said second bore having an enlarged diameter portion at said inner end thereof thereby creating a shoulder in said second bore outwardly of said inner end thereof;

a horizontally disposed and generally U-shaped perch horizontally movably mounted on said feed port assembly at said lower end of said feed port assembly;

said perch including a horizontally disposed first leg member having an inner end and an outer end, a horizontally disposed second leg member having an inner end and an outer end, and a horizontally disposed base leg member extending between said outer ends of said first and second leg members;

said first leg member being comprised of a resilient material;

said first leg member yieldably extending laterally and inwardly from said outer end thereof to said inner end thereof;

said second leg member being comprised of a resilient material;

said second leg member yieldably extending laterally and inwardly from said outer end thereof to said inner end thereof;

said second leg having an enlarged head portion, having inner and outer ends, at said inner end of the second leg;

said first leg member being slidably mounted in said first bore;

said first leg member being in frictional engagement with said side wall of said first bore;

said second leg member being slidably mounted in said second bore;

said second leg member being in frictional engagement with said side wall of said second bore;

said perch being selectively horizontally movable with respect to said feed port assembly and said seed container between an extended position and a retracted position;

said inner end of said first leg member being in engagement with said shoulder in said first bore, when said perch is in said extended position, to yieldably prevent said perch from moving inwardly from said extended position;

said outer end of said enlarged head portion of said second leg member engaging said shoulder in said second bore, when said perch is in said extended position, to prevent said perch from moving outwardly from said extended position;

the frictional engagement of said first and second leg members with said side walls of said first and second bores respectively yieldably maintaining said perch in said retracted position;

the frictional engagement of said first and second leg members with said side walls of said first and second bores respectively yieldably maintaining said perch in position between said extended and retracted positions;

said base leg member being positioned adjacent said feed port assembly when said perch is in said retracted position; and said base leg member being positioned outwardly of said feed port assembly when said perch is in said extended position whereby said first and second leg members and said base leg member serve as a perch for birds landing thereon.

\* \* \* \* \*